UNITED STATES PATENT OFFICE.

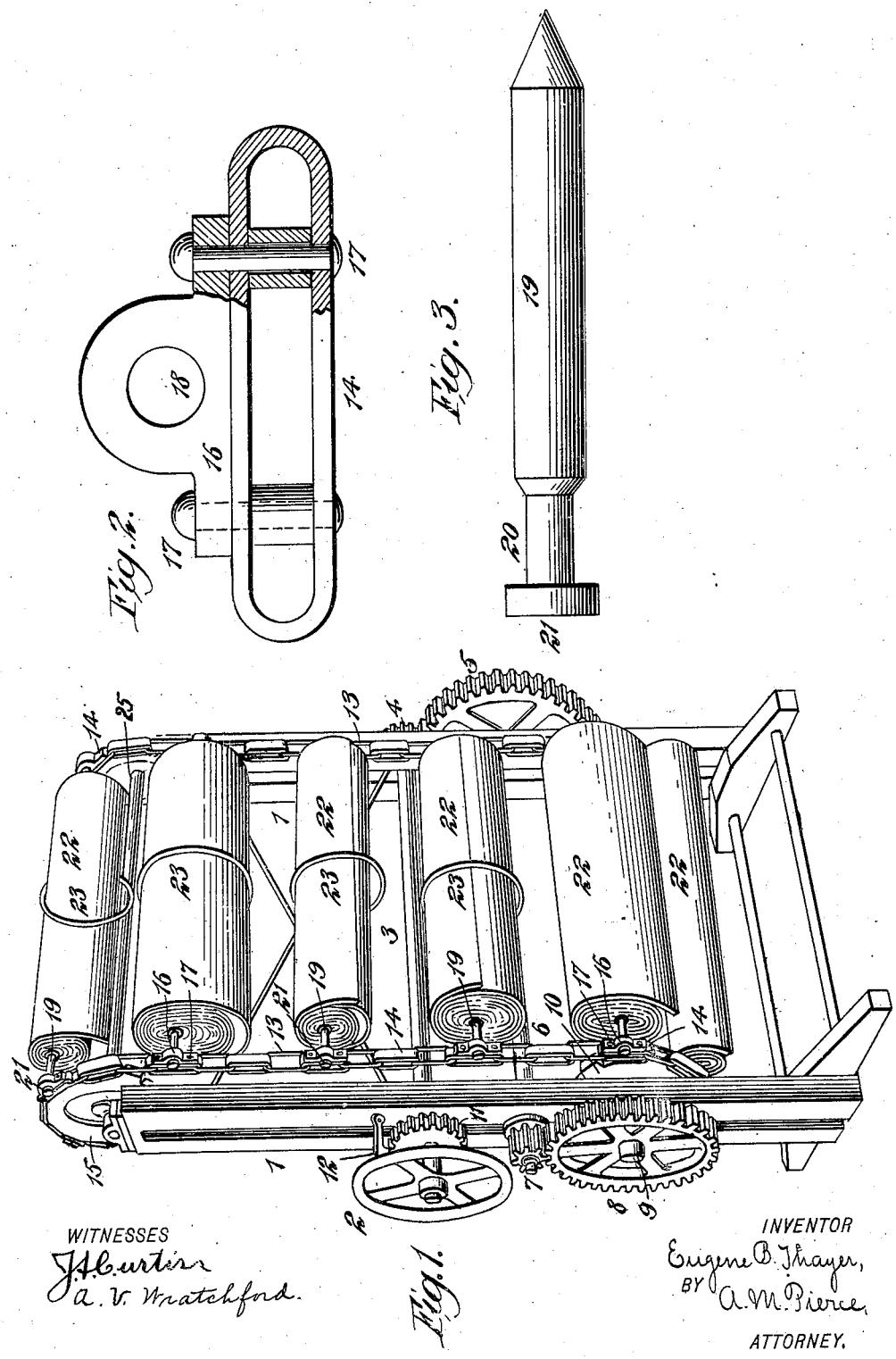

EUGENE B. THAYER, OF JERSEY CITY, NEW JERSEY.

SHEET-PACKING CARRIER.

No. 846,962.  Specification of Letters Patent.  Patented March 12, 1907.

Application filed December 7, 1906. Serial No. 346,720.

*To all whom it may concern:*

Be it known that I, EUGENE B. THAYER, a citizen of the United States, residing at Jersey City, in the county of Hudson and State of New Jersey, have invented certain new and useful Improvements in Sheet-Packing Carriers, of which the following is a specification, reference being had therein to the accompanying drawing.

My invention relates especially to means and mechanism for conveniently displaying and carrying rolls of heavy sheet packing, and has for its object the provision of a carrier for such packing whereby a number of rolls may be so arranged and movably and removably held in place as to greatly simplify and facilitate the handling, measuring, &c., of such packing.

To attain the desired end, my invention consists, essentially, in certain novel and useful combinations or arrangements of parts and peculiarities of construction and operation, all of which will be hereinafter first fully described and then pointed out in the claim.

In the drawing, Figure 1 is a perspective view of a carrier embodying my invention. Fig. 2 is an enlarged side elevation of a carrier-chain link, and Fig. 3 is an enlarged view of one of the roll-supporting pins.

Like numerals of reference, wherever they occur, indicate corresponding parts in all the figures.

1 are the uprights of the main frame of the carrier. 2 is a hand-wheel mounted on a shaft 3, passing between the uprights 1 and journaled therein. The shaft 3 bears a gear 4, meshing with a gear 5 on a shaft 6, also journaled in the main-frame pieces 1. The opposite extremity of the shafts 6 bears a gear 7, meshing with a gear 8 upon a shaft 9, journaled in the pieces 1 and bearing sprocket-wheels 10. 11 is a ratchet-wheel on the shaft 3, and 12 is a controlling-ratchet for engaging therewith. A sprocket-chain made up of alternate links 13 of round rod and flat links 14 passes around the sprockets 10 and over corresponding sprockets 15, mounted on a shaft 25 at the top of the pieces 1. Every other link 14 is provided with a bearing-block 16, secured thereto by bolts or rivets 17. Each bearing-block 16 has a bearing perforation 18 therethrough, as particularly illustrated in Fig. 2 of the drawing.

19 is a pin having a body of substantially the same diameter as the perforation 18, an extension 20 of less diameter than the body, and a head 21.

22 represent rolls of sheet-packing, and 23 are rings for preventing accidental unrolling of the material.

In use when it is desired to place a roll of packing on the carrier, such roll usually being wound upon a tube or hollow shaft, the roll is lifted to position, and then a pin 19 is passed through a bearing-block 16, entering the tube or hollow shaft of the roll at each end. The head 21 on each of the pins 19 holds it against passing into the perforation 18, and the extension 20 drops into the bearing, preventing the withdrawal of the pin from engagement with the roll.

When it is required to cut off a piece of the packing from a roll, the desired roll is brought to a position for drawing out upon a cutting-table or any other preferred support by turning the hand-wheel 2 and rotating the sprockets to move the roll-supporting chains to the requisite position. The ring 23 is moved to one side off of the roll, and after severing a piece of packing the ring is returned to its initial holding position.

Having now fully described my invention, what I claim as new therein, and desire to secure by Letters Patent, is—

A sheet-packing carrier in which is comprised a frame; a hand-wheel mounted on a shaft and having a ratchet-wheel and retaining-ratchet at one side of the frame; a gear on said shaft for actuating a train for moving a main shaft; a pair of sprocket-wheels on said main shaft; a free shaft at the top of the frame bearing sprocket-wheels; a sprocket-chain passing over the two sets of sprocket-wheels, said chains bearing projecting blocks having perforations therethrough, and removable pins, the bodies whereof are of substantially the same diameter as the perforations in said blocks, the pins having heads at their outer ends, a portion of each pin next to the head being of less diameter than the body of the pin; the whole combined and arranged to operate, substantially as shown and described.

In testimony whereof I hereto affix my signature in presence of two witnesses.

EUGENE B. THAYER.

Witnesses:
  LOUIS F. BRAUN,
  A. M. PIERCE.